(12) United States Patent
Jeong et al.

(10) Patent No.: US 10,129,554 B2
(45) Date of Patent: *Nov. 13, 2018

(54) METHOD AND APPARATUS FOR PROCESSING VIDEO

(71) Applicant: CHIPS & MEDIA, INC, Seoul (KR)

(72) Inventors: Wook Je Jeong, Gwacheon-si (KR); Min Yong Jeon, Seoul (KR); Dong Jin Park, Namyangju-si (KR)

(73) Assignee: CHIPS & MEDIA, INC, Seoul (KR)

( * ) Notice: Subject to any disclaimer, the term of this patent is extended or adjusted under 35 U.S.C. 154(b) by 304 days.

This patent is subject to a terminal disclaimer.

(21) Appl. No.: 14/841,177

(22) Filed: Aug. 31, 2015

(65) Prior Publication Data

US 2015/0373330 A1    Dec. 24, 2015

Related U.S. Application Data

(63) Continuation of application No. PCT/KR2013/006650, filed on Jul. 24, 2013.
(Continued)

(51) Int. Cl.
*H04N 19/44*    (2014.01)
*H04N 19/61*    (2014.01)
(Continued)

(52) U.S. Cl.
CPC .......... *H04N 19/44* (2014.11); *H04N 19/117* (2014.11); *H04N 19/124* (2014.11); *H04N 19/13* (2014.11); *H04N 19/172* (2014.11); *H04N 19/176* (2014.11); *H04N 19/18* (2014.11); *H04N 19/428* (2014.11); *H04N 19/433* (2014.11); *H04N 19/573* (2014.11); *H04N 19/58* (2014.11); *H04N 19/61* (2014.11)

(58) Field of Classification Search
None
See application file for complete search history.

(56) References Cited

U.S. PATENT DOCUMENTS 5,502,499 A    3/1996 Birch
5,973,740 A   10/1999 Hrusecky
(Continued)

FOREIGN PATENT DOCUMENTS

CN    001820504 A    8/2006
CN    101777366 A *  7/2010
(Continued)

*Primary Examiner* — James M Anderson, II
(74) *Attorney, Agent, or Firm* — Novick, Kim & Lee, PLLC; Sang Ho Lee

(57) ABSTRACT

Provided is an apparatus for processing a video. The apparatus for processing a video includes an image receiving module that is configured to receive encoded data, a filtering module that is configured to filter an image frame reconstructed from the encoded image, a block dividing module that is configured to divide the filtered image frame into a plurality of blocks, a compression module that is configured to compress each of the plurality of blocks, package the compressed plurality of blocks into a predetermined unit, and generate lookup table information corresponding to each of the packaged plurality of blocks, and a frame buffer memory that is configured to record the packaged data and the lookup table information.

18 Claims, 11 Drawing Sheets

Related U.S. Application Data

(60) Provisional application No. 61/807,663, filed on Apr. 2, 2013.

(51) Int. Cl.

| | | |
|---|---|---|
| *H04N 19/426* | (2014.01) | |
| *H04N 19/573* | (2014.01) | |
| *H04N 19/58* | (2014.01) | |
| *H04N 19/13* | (2014.01) | |
| *H04N 19/172* | (2014.01) | |
| *H04N 19/18* | (2014.01) | |
| *H04N 19/117* | (2014.01) | |
| *H04N 19/124* | (2014.01) | |
| *H04N 19/176* | (2014.01) | |
| *H04N 19/433* | (2014.01) | |

(56) References Cited

U.S. PATENT DOCUMENTS

| | | |
|---|---|---|
| 6,115,496 A | 9/2000 | Nguyen |
| 6,151,660 A | 11/2000 | Aoki |
| 6,799,246 B1 | 9/2004 | Wise |
| 7,333,545 B2 | 2/2008 | Duruoz |
| 7,403,487 B1 | 7/2008 | Foladare |
| 2003/0138045 A1 | 7/2003 | Murdock |
| 2005/0232501 A1 | 10/2005 | Mukerjee |
| 2007/0046698 A1* | 3/2007 | Nam .................. G06F 3/14 |
| | | 345/660 |
| 2008/0285652 A1 | 11/2008 | Oxman |
| 2010/0053357 A1 | 3/2010 | Ikeda |
| 2011/0002396 A1* | 1/2011 | Ivanov ............ H04N 19/105 |
| | | 375/240.24 |
| 2011/0206289 A1 | 8/2011 | Dikbas |
| 2012/0230423 A1 | 9/2012 | Esenlik |
| 2012/0320067 A1 | 12/2012 | Iourcha |
| 2013/0022104 A1 | 1/2013 | Chen |

FOREIGN PATENT DOCUMENTS

| | | |
|---|---|---|
| CN | 101971633 A | 2/2011 |
| CN | 102948149 A | 2/2013 |
| JP | 09-093425 A | 4/1997 |
| JP | 2001-022553 A | 1/2001 |
| JP | 2003-348592 A | 12/2003 |
| JP | 2006-262449 A | 9/2006 |
| JP | 2012-199608 A | 10/2012 |
| KR | 10-1994-0003388 A | 2/1994 |
| KR | 10-2005-0015616 A | 2/2005 |
| KR | 10-2008-0046345 A | 5/2008 |
| KR | 10-20100003167 A | 1/2010 |
| KR | 10-2010-0117107 A | 11/2010 |
| KR | 10-20110047697 A | 5/2011 |
| KR | 10-2012-0120091 A | 11/2012 |

\* cited by examiner

| BW Saving : 60.70% | | qp 22 : 58.75% | | qp 27 : 60.17% | | qp 32 : 61.30% | | qp 37 : 62.56% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,106.68 | 1,937.94 | 973.51 | 1,790.27 | 849.86 | 1,596.94 | 715.39 |
| FHD 30fps | 89.65 | 477.82 | 182.88 | 407.88 | 152.48 | 370.59 | 137.49 | 350.26 | 126.48 |
| Conference 720p 60fps | 79.10 | 306.85 | 107.69 | 281.03 | 94.50 | 269.62 | 89.42 | 257.67 | 83.20 |
| Screen 720p 30fps | 39.55 | 100.11 | 39.17 | 98.21 | 37.40 | 95.91 | 35.55 | 94.46 | 34.54 |

| BW Saving : 32.22% | | qp 22 : 32.93% | | qp 27 : 32.33% | | qp 32 : 31.94% | | qp 37 : 31.67% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,512.38 | 1,937.94 | 1,379.22 | 1,790.27 | 1,255.57 | 1,596.94 | 1,121.09 |
| FHD 30fps | 89.65 | 477.82 | 272.53 | 407.88 | 242.13 | 370.59 | 227.14 | 350.26 | 216.13 |
| Conference 720p 60fps | 79.10 | 306.85 | 186.79 | 281.03 | 173.60 | 269.62 | 168.52 | 257.67 | 162.30 |
| Screen 720p 30fps | 39.55 | 100.11 | 78.72 | 98.21 | 76.95 | 95.91 | 75.11 | 94.46 | 74.09 |

METHOD AND APPARATUS FOR PROCESSING VIDEO

TECHNICAL FIELD

The present invention relates to a method and apparatus for processing a video, and more particularly, a method and apparatus for processing a video, capable of improving bandwidth efficiency of a frame buffer memory.

BACKGROUND ART

The present invention results from a research, which has been carried out as a part of work which was supported by ICT R&D program of MSIP/IITP [10043450, Development of Video Server Technology for Capturing, Editing, Ingesting, and Transmitting 8K and S3D 4K UHD Contents], and supported by the Technology Innovation Program (10049498, 4K UHD HEVC/VP9 SoC for Streaming Smart Device) funded by the Ministry of Trade, Industry and Energy (MOTIE, KOREA).

Recent improvement of video processing algorithms allows a video processing apparatus to process much larger-scale images.

Specifically, with need for ultrahigh definition (UHD), existing video compression techniques have difficulty in accommodating sizes of storage media and bandwidths of transfer media. Accordingly, a novel standard for compression of UHD video is needed. As a result, high efficiency video coding (HEVC) has completely been standardized on January in 2013. The HEVC may be available for a video stream serviced through networks, such as the Internet, 3G, long term evaluation (LTE), etc, in which not only UHD but also full high definition (FHD) or high definition (HD) videos can be compressed in accordance with HEVC.

A UHD TV is considered to mainly provide 4K (4096×2304 pixels) UHD at 30 frames per second (fps) in the short term, while the number of pixels to be processed per second is expected to continuously increase to 4K 60 fps/120 fps, 8K 30 fps/60 fps, and the like. A bandwidth on demand per frame for a bidirectional frame prediction and filtering is expected to remarkably increase as well.

To deal with the increase in the processing bandwidths, a transmission bandwidth between system modules or to the exterior should also be improved based on performance or functions required for applications.

However, unlike the remarkable increase in the required processing bandwidth in response to an increase in image resolutions to be processed and frame rates, a bandwidth for transmission thereof is limited.

For example, a bandwidth for storing an image in a frame buffer memory or extracting the image from the frame buffer memory may be limited according to a minimum burst length of a memory application.

To overcome this problem, a method of compressing images which are input and/or output in/out the frame buffer memory is taken into account, but fails to provide a remarkable bandwidth reduction effect.

Also, current frame buffer compression techniques are using a loss compression algorithm for obtaining high compression efficiency. However, the loss compression algorithm brings about a gradual decrease of quality and a change of a compression data format.

Due to the format change, a process of searching for a frame buffer memory for random access is made complicated, thereby increasing a throughput and a processing time again.

DISCLOSURE

Technical Problem

The present invention has been made keeping in mind the drawbacks of the related art, and an object of the invention is to provide a video processing apparatus and method, capable of improving bandwidth efficiency even without degradation of quality, by use of lossless compression of a frame buffer.

Another aspect of the invention is to provide a video processing apparatus and method, which enables fast processing by providing a compression format of a frame buffer which is easy to access while maintaining a lossless state.

Technical Solution

In order to achieve the above object, there is provided an apparatus for processing a video according to one embodiment disclosed herein, the apparatus including an image receiving module to receive an encoded image, a filtering module to filter an image frame reconstructed from the encoded image, a block dividing module to divide the filtered image frame into a plurality of blocks, a compression module to compress each of the plurality of blocks, package the compressed plurality of blocks into a predetermined unit, and generate lookup table information with respect to each of the packaged plurality of blocks, and a frame buffer memory to record the packaged data and the lookup table information.

The present disclosure provides a method for processing a video in an image processing method for a video processing apparatus. The method for processing the video may include receiving an encoded image, filtering an image frame reconstructed from the encoded image, dividing the filtered image frame into a plurality of blocks, compressing each of the plurality of blocks, packaging the compressed plurality of blocks into a predetermined unit, generating lookup table information with respect to each of the packaged plurality of blocks, and recording the packaged data and the lookup table information.

Meanwhile, the video processing method may be implemented as a computer-readable recording medium having a program executable on a computer.

Advantageous Effects

According to various embodiments, the present invention can provide an apparatus and method for processing a video, which is capable of improving processing efficiency by reducing bandwidths of a memory without degradation of quality, even for an image with a large number of pixels (4K 60 fps/120 fps, 8K 30 fps/60 fps/ . . . , etc.) to be processed per second.

Also, according to various embodiments, the present invention can provide an apparatus and method for processing a video, which is capable of improving processing performance by facilitating an access to a compressed frame buffer memory.

According to various embodiments, the present invention can provide an apparatus and method for processing a video, which is capable of reducing overhead of input and/or output information in a frame buffer memory and facilitating a system configuration and improving stability of the system by reducing a variation of bandwidths.

MODE FOR INVENTION

Figure 1:
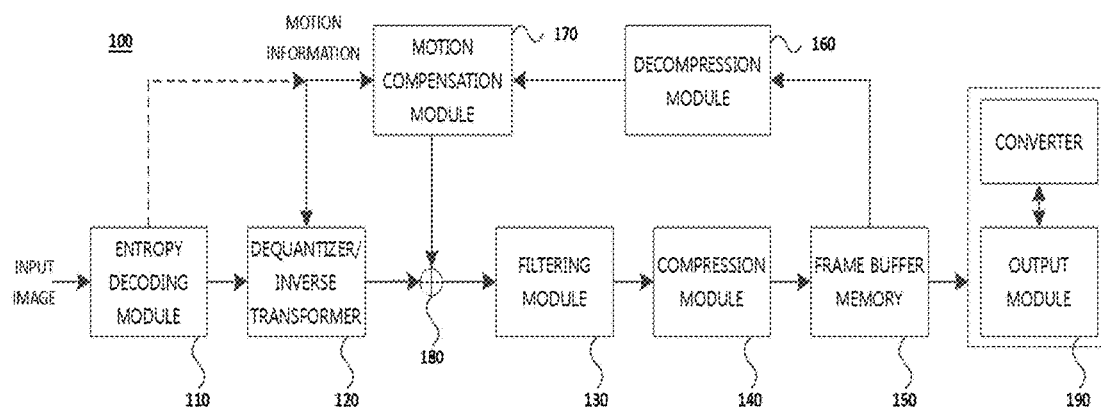
FIG. 1 is a block diagram illustrating a configuration of a video decoding apparatus in accordance with one exemplary embodiment disclosed herein.

Hereinafter, description will be given in detail of the preferred embodiments of the present invention to be easily practiced by those skilled in the art to which the present invention belongs, with reference to the accompanying drawings. However, the present invention can be embodied in many different forms and should not be construed as limited to those exemplary embodiments set forth herein. Configurations or elements unrelated to the description are omitted in the drawings as to clarify the present invention and like reference numerals refer to like elements throughout.

It will be understood that when an element is referred to as being "connected with" another element, the element can be connected with the other element or intervening elements may also be present.

It will be understood that when an element is referred to as being "on" another element, the element can be directly on the another element or intervening elements may also be present between the two elements.

Unless specified otherwise, the terms "comprise," "include," "comprising," and/or "including" specify the presence of elements and/or components, but do not preclude the presence or addition of one or more other elements and/or components. The terms "about" and "substantially" used in this specification to indicate degree are used to express a numerical value or an approximate numerical value when a mentioned meaning has a manufacturing or material tolerance and are used to prevent those who are dishonest and immoral from wrongfully using the disclosure of an accurate or absolute numerical value made to help understanding of the present invention. The term "stage (of doing)" of "stage of" used in this specification to indicate degree does not mean "stage for."

It will be noted that the expression "a combination thereof" in a Markush statement means a mixture or combination of one or more selected from the group consisting of elements mentioned in the Markush statement, being construed as including one or more selected from the group consisting of the elements.

To encoding an actual picture (image) and a depth information map thereof, High Efficiency Video Coding (HEVC) providing optimal coding efficiency among existing video coding standards, which is under joint standardization by the Moving Picture Experts Group (MPEG) and Video Coding Experts Group (VCEG), may be used as an example, without being limited thereto. A decoding apparatus according to an embodiment of the present invention may perform decoding through various types (MPEG2, AVC, etc.) of codecs using a frame buffer memory.

Generally, a video processing apparatus may include an encoding apparatus or a decoding apparatus. The encoding apparatus includes an encoding process and a decoding process, and the decoding apparatus includes a decoding process. The decoding process of the decoding apparatus may be the same as the decoding process of the encoding apparatus. Thus, the following description will be made on the decoding apparatus FIG. 1 is a block diagram illustrating a configuration of a video decoding apparatus in accordance with one exemplary embodiment of the present invention.

As illustrated in FIG. 1, a video decoding apparatus 100 disclosed herein includes an entropy decoding module 110, a dequantizer/inverse transformer 120, an adder 180, a filtering module 130, a compression module 140, a frame buffer memory 150, a decompression module 160, a motion compensation module 170, and an output module 190.

According to one exemplary embodiment of the present invention, the video decoding apparatus 100 may further include an intra/inter changeover switch and an intra prediction module. Here, this one exemplary embodiment illustrates in more detail a method of compressing and packaging a reference frame for generating a prediction block and a motion compensating process upon inter-frame prediction (in an inter mode) using the method.

The entropy decoding module 110 decodes a coded (encoded) bit stream transmitted from a video encoding apparatus to separate into an intra-prediction mode index, motion information, a quantization coefficient sequence, and the like. The entropy decoding module 110 may provide the decoded motion information to the motion compensation module 170.

The entropy decoding module 110 may provide the intra-prediction mode index to the motion compensation module 170 and the dequantizer/inverse transformer 120. Also, the entropy decoding module 110 may provide a dequantization coefficient sequence to the dequantizer/inverse transformer 120.

The dequantizer/inverse transformer 120 may transform the quantization coefficient sequence into a two-dimensional (2D) array of dequantization coefficients. The dequantizer/inverse transformer 120 may select one of a plurality of scanning patterns for transformation. The dequantizer/inverse transformer 120 may select one of the plurality of scanning patterns on the basis of at least one of a prediction mode (that is, one of intra prediction and inter prediction) of a current block and an intra prediction mode.

The dequantizer/inverse transformer 120 may receive the intra prediction mode from the motion compensation module 170 or the entropy decoding module 110.

The dequantizer/inverse transformer 120 recovers (or reconstructs) the quantization coefficients using a quantization matrix, which is selected from a plurality of quantization matrices, to the 2D array of dequantization coefficients. Different quantization matrices may be applied depending on a size of a current block to be reconstructed, and a quantization matrix may be selected for blocks of the same size based on the prediction mode of the current block and the intra prediction mode.

The dequantizer/inverse transformer 120 inverse-transforms the reconstructed quantization coefficients to reconstruct a residual block.

The adder 180 adds the residual block reconstructed by the dequantizer/inverse transformer 120 and a prediction block generated by the intra prediction module or the motion compensation module 170, thereby reconstructing a picture block.

The filtering module 130 filters off the reconstructed image, generated by the adder 180. Artifacts due to picture loss generated during a quantization process may be reduced by the filtering. For example, the filtering module 130 may perform a deblocking filtering process for removing a blocking effect occurring in a reconstructed picture, an adaptive offset application process for compensating for a difference value from an original picture by each pixel, and an adaptive loop filtering process for compensating for a difference value from an original picture by each coding unit.

The frame buffer memory 150 is a memory to store a local decoding picture which has been subjected to filtering by the filtering module 130. The frame buffer memory 150 may store a plurality of frames or pictures for motion compensation. Data formats of stored and output frames may be changeable by the compression module 140 and the decompression module 160.

The frame buffer memory 150, for example, may include at least one of storage media, such as a flash memory type, a hard disk type, a multimedia card micro type, a card memory type (e.g., SD or XD memory), RAM and ROM (e.g., EEPROM, etc.).

The compression module 140 is a module to compress frames stored in the frame buffer memory 150 according to the video processing method of the present invention. The decompression module 160 is a module to extract a random access target frame from the frame buffer memory 150, in response to a request of the motion compensation module 170, and to perform a decompression (inverse compression) for the target frame.

Specifically, the compression module 140 according to an exemplary embodiment of the present invention may perform lossless compression and uncompression to prevent degraded quality. Also, the compression module 140 may generate compression and information and separately manage the compression information in the form of a lookup table to realize a bandwidth reduction.

For example, the compression module 140 may receive the loop-filtered frame, perform an adaptive entropy process using DPCM with respect to the frame, and thus acquire losslessly-compressed texture segments.

The compression module 140 may generate compression information, which includes offset information related to each of the texture segments, package the texture segments by a burst length, and store the packaged texture segments in the frame buffer memory 150 along with the compression information. The frame buffer memory 150 may be an external memory which is connected through an AXI bus interface.

By virtue of the compression processing of the compression module 140 and the operation of the decompression module 160 according to the exemplary embodiment disclosed herein, random access of the motion compensation module 170 to the frame buffer memory 150 can be facilitated.

Also, 50% of the bandwidth reduction efficiency can result from the lossless compression and the storage based on the burst length according to the exemplary embodiment disclosed herein. The configuration of the compression module 140 will be explained later.

The motion compensation module 170 reconstructs an intra prediction mode of a current block on the basis of the intra prediction mode index received from the entropy decoding module 120, and generates a prediction block according to the reconstructed intra prediction mode.

Specifically, the motion compensation module 170 may randomly access the compressed picture stored in the frame buffer memory 150 through the decompression module 160 on the basis of motion vector information, and accordingly generate a prediction block for a current block. When a point-precision motion compensation is applied, a selected interpolation filter is used to generate the prediction block. The generated prediction block may be transferred to the adder 180.

Meanwhile, although not illustrated, the intra/inter changeover switch may provide the prediction block, which has been generated by one of the intra prediction module and the motion compensation module 170, to the adder 180 based on an encoding mode.

In order to generate the prediction block for the motion compensation, the motion compensation module 170 may further include a demultiplexer, a motion information encoding mode determination unit, a merge mode motion information decoding unit, an advanced motion vector prediction (AMVP) mode motion information decoding unit, a prediction block generation unit, a residual block decoding unit, and a reconstructed block generation unit.

The motion information includes a reference picture index and a motion vector. The reference picture index indicates any one picture previously encoded and reconstructed.

When a current block is subjected to unidirectional inter predictive encoding, the motion information indicates one of reference pictures included in list 0 (L0). On the other hand, when the current block is subjected to bidirectional predictive encoding, the motion information may include a reference picture index indicating one of the reference pictures of the list 0 (L0), and a reference picture index indicating one of reference pictures of list 1 (L1).

Also, when the current block is subjected to the bidirectional predictive encoding, the motion information may include one or two pictures among reference pictures included in a combined list (LC) of the list 0 and the list 1.

The motion vector indicates a position of a prediction block within a picture indicated by each reference picture index. The motion vector may be a pixel unit (integer unit) or a sub pixel unit.

For example, the motion vector may have a resolution of ½, ¼, ⅛ or 1/16 pixel. When the motion vector is not an integer unit, the prediction block is generated from integer pixels.

The demultiplexer demultiplexes encoded motion information and encoded residual signals from a bit stream received. The demultiplexer transmits the demultiplexed motion information to the motion information encoding mode determination unit, and the demultiplexed residual signals to the residual block decoding unit.

The motion information encoding mode determination unit determines a motion information encoding mode of a current block. The motion information encoding mode determination unit may determine the motion information encoding mode of the current block according to skip flag of a bit stream received. The motion information encoding mode may include, but not limited to, at least one of a skip mode, a merge mode and an AMVP mode.

The skip mode may be applied when a skip candidate having the same motion information as motion information on a current block is present and a residual signal is 0. Also, the skip mode may be applied when the current block has the same size as a coding unit. The current block may be regarded as a prediction unit.

The merge mode may be applied when a merge candidate having the same motion information as motion information on a current block is present. The merge mode may be applied when the current block has a different size from a coding unit or when a residual signal is present if the current block has the same size as the coding unit. The merge candidate may be the same as the skip candidate.

The AMVP mode may be applied when the skip mode and the merge mode are not adopted. An AMVP candidate having the most similar motion vector to a motion vector of a current block is selected as an AMVP predictor.

The prediction block generation unit generates a prediction block of a current block using the reconstructed motion information. When the motion vector is an integer unit, the prediction block generation unit may generate a prediction block of a current block by copying a block, which corresponds to a position represented by a motion vector in a picture indicated by a reference picture index.

However, when the motion vector is not an integer unit, the prediction block generation unit may generate pixels of the prediction block from integer pixels within the picture indicated by the reference picture index. In this instance, in a luma pixel, a predictive pixel may be generated using a 8-tap interpolation filter. In a chroma pixel, a predictive pixel may be generated using a 4-tap interpolation filter.

The residual block decoding unit performs entropy decoding with respect to residual signals. The residual block decoding unit inversely scans entropy-decoded coefficients so as to generate a 2D block of quantized coefficients. Different types of inverse scanning may be used depending on entropy decoding methods.

That is, different inverse scanning methods may be used for the inter predicted residual signals depending on CABAC-based decoding and CAVLC-based decoding. For example, diagonal raster inverse scanning may be available for CABAC-based decoding, while zigzag inverse scanning may be available for CAVLC-based decoding.

Also, different inverse scanning methods may be decided depending on a size of the prediction block.

The residual block decoding unit dequantizes a generated coefficient block using a dequantization matrix. A quantization parameter is reconstructed to derive the quantization matrix. A quantization step size is reconstructed by each coding unit of a predetermined size or larger. The predetermined size may be 8×8 or 16×16.

The residual block decoding unit may inversely transform the dequantized coefficient block to reconstruct a residual block. The reconstructed block generation unit may add the prediction block generated by the prediction block generation unit and the residual block generated by the residual block decoding unit.

In this manner, a current block may be reconstructed by using the reconstructed prediction block of the current block and the decoded residual block of the current block. The reconstructed current block may then be filtered and compressed to be stored in the frame buffer memory 15. Such current block may be transferred to the motion compensation module 170 after being decompressed or output to the output module 190.

The output module 190 may process data output from the frame buffer memory 150, and display or externally transmit the processed data. An image signal, a data signal, an OSD signal and the like, processed in the output module 190 may be converted into R, G, and B signals, respectively, thereby being generated as driving signals.

Also, the output module 190 may further include a converter to reconstruct data compressed by the compression module 140 into an image signal. The output module 190 may include PDP, LCD, OLED, flexible display, 3D display and the like to display the converted image signal.

Figure 2:
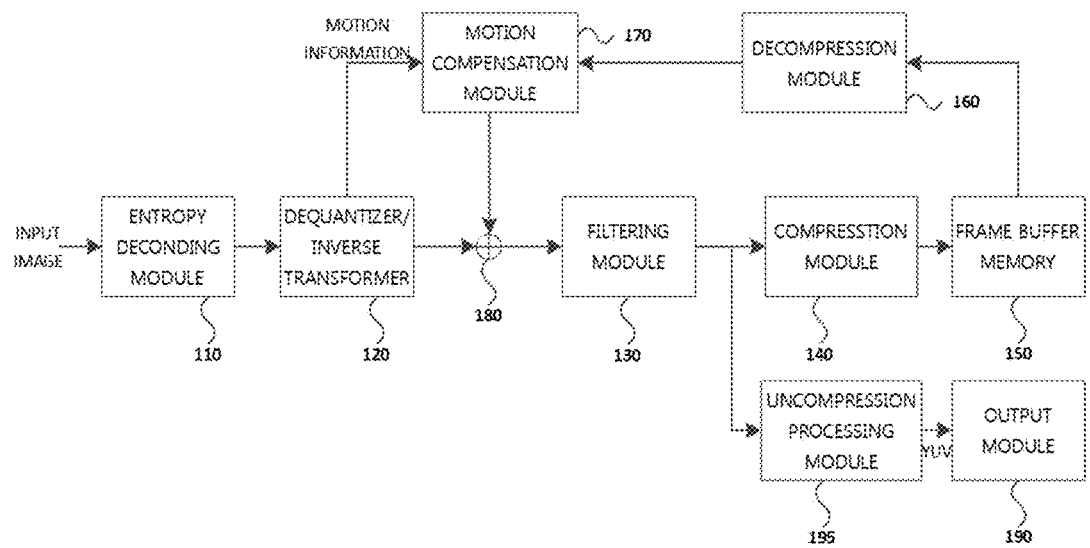
FIG. 2 is a block diagram illustrating a configuration of a video decoding apparatus in accordance with another exemplary embodiment disclosed herein.
Figure 3:
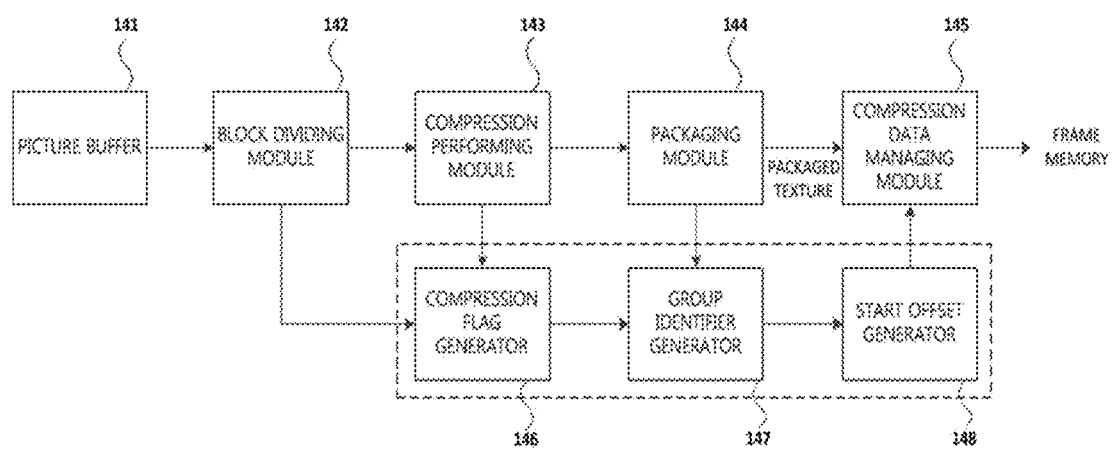
FIG. 3 is a block diagram illustrating in more detail a configuration of a compression module of a video decoding apparatus in accordance with an exemplary embodiment disclosed herein.

FIG. 2 is a block diagram illustrating a configuration of a video decoding apparatus in accordance with another exemplary embodiment disclosed herein.

As illustrated in FIG. 2, a video decoding apparatus 100 according to another embodiment according to the present invention includes an entropy decoding module 110, a dequantizer/inverse transformer 120, an adder 180, a filtering module 130, a compression module 140, a frame buffer memory 150, an decompression module 160, a motion compensation module 170, and an output module 190. The video decoding apparatus 100 may further include an uncompression processing module 195.

In FIG. 2, the other components except for the compression module 140, the uncompression processing module 195 and the output module 190 perform similar operations to those illustrated in FIG. 1, so detailed description thereof will be omitted.

As illustrated in FIG. 2, the uncompression processing module 195 included in the another embodiment disclosed herein may transfer an image, which has been filtered by the filtering module 130, directly to the output module 190 without passing through the compression module 140.

Specifically, the uncompression processing module 195 may transfer an image frame, which has been subjected to decoding and filtering, to the output module 190 in a line-by-line writing manner. To this end, the uncompression processing module 195 may include a separate buffer memory. A burst length of data may be predetermined as 64 bytes, 128 bytes or the like.

In this manner, when a pure YUV image signal which is uncompressed is transferred to the output module 190, the output module 190 may output the image signal directly through a display or the like even without performing the decompression (or inverse compression). Also, the output module 190 may easily perform post-processing such as scaling by using the pure YUV image signal, which may result in extending a utilization range.

Therefore, the exemplary embodiment illustrated in FIG. 2 may not include a separate decompression processor, and the compression module 140 may compress only a reference frame which is used for motion compensation and store the compressed reference frame in the frame buffer memory, thereby improving video processing efficiency.

Hereinafter, description will be given in detail of the configuration of the compression module of the video encoding apparatus in accordance with an embodiment disclosed herein.

In accordance with one exemplary embodiment of the present invention, the compression module 140 may include a picture buffer 141, a block dividing module 142, a compression performing module 143, a packaging module 144, a compression data managing module 145, a compression flag generator 146, a group identifier generator 147, and a start offset generator 148.

The picture buffer 141 may receive an image signal which has been filtered and output from the filtering module 130, and store the image signal in a buffer by each frame.

The block dividing module 142 acquires each frame from the picture buffer 141, and divides the acquired frame into a plurality of compression blocks according to a size of a preset compression unit. In this embodiment of the present invention, the size of the compression unit may be fixed, and each frame may be divided into 16×4 blocks, for example.

The compression performing module 143 decides whether or not to compress each block, and perform a lossless compression for blocks which have been decided to be compressed.

Specifically, according to the exemplary embodiment of the present invention, the compression performing module 143 may select one of lossless compression or uncompression for each divided block.

For example, the compression performing module 143 may select, as a compression method, a lossless variable-length compression method, such as a DPCM entropy coding method.

However, the compression performing module 143 may compare a size of data subjected to the variable-length compression with a size of uncompressed data, and select the uncompression method when the size of the data subjected to the variable-length compression is greater than the size of the uncompressed data.

In this manner, the compression performing module 143 may apply different compression methods for each block, and in some cases, employ the uncompression processing.

Also, the compression performing module 143 may select a method which can provide optimal bandwidth efficiency from the compression or the uncompression. Specifically, in order to overcome a degradation of quality due to the loss compression and a reduction of bandwidth efficiency due to an increased calculation, which are caused in the related art, the compression performing module 143 may also select a method for maximizing only the reduced bandwidth efficiency, irrespective of a compression degree.

Accordingly, the compression performing module 143 may transfer information indicating whether or not to compress a current block to the compression flag generator 146.

Then, the compression flag generator 146 may generate a compression flag which indicates whether or not to compress the current block. The compression flag, for example, may have a form of 1-bit flag indicating compression or uncompression. The compression flag may correspond to each block, and be transferred to the group identifier generator.

Meanwhile, the packaging module 144 groups data compressed by the compression performing module 143 for each block, and packages the grouped data.

The packaging module 144 may arrange the compressed blocks in one line, and group the arranged blocks on the basis of a burst length of the frame buffer memory 150. Each compressed block set grouped in the packaging module 144 may be referred to as a burst group (BG).

For example, a burst length may be 128 bytes. In this instance, the packaging module 144 groups the compressed blocks to be included in a group based on the 128-byte burst length for packaging.

The packaging module 144 transfers the packaged texture data to the compression data managing module 145 for each burst group. The compression data managing module 145 may perform writing for the frame buffer memory 150 for each burst group. This may bring about a reduction of a bandwidth variation resulting from the variable-length compression. Also, since compression efficiency of the lossless compression is maintained, the packaging module 144 can maintain an improved state of bandwidth efficiency (or a reduced state of bandwidths required) while maintaining system stability.

Also, the packaging module 143 may generate packaging information, which indicates a group to which each block belongs in response to being packaged and a position within the group, and transfer the packaging information to the group identifier generator 147.

The group identifier generator 147 may generate a group identifier which indicates a group, to which a currently-processed block belongs, from the packaging information. The group identifier may include a 8-bit burst group identifier (ID), for example.

The burst group identifier may indicate a relative position of each group with respect to a specific base address.

The start offset generator 148 may generate start offset information which indicates a start position of a current block within a group on the basis of the packaging information. The offset information, for example, may include 7-bit start byte offset information. The start byte offset information may indicate a relative start position of each block.

Meanwhile, the compression flag generator 146, the group identifier generator 147 and the start offset generator 148 may transfer the compression flag, the group identifier and the start offset information, which are related to the current block, to the compression data managing module 145, respectively.

The compression data managing module 145 may generate lookup table information by combining the compression flag, the group identifier and the start offset information, and record the generated lookup table information in the frame buffer memory 150.

In more detail, the compression data managing module 145 may generate the lookup table information corresponding to each block. The compression data managing module 145 may generate 2-byte lookup table information by using 1-bit compression flag, 8-bit group identifier and 7-bit offset information.

The generated lookup table information and the packaged data may be recorded in the frame buffer memory 150. As aforementioned, the packaged data may be recorded in the frame buffer memory 150 on the basis of the burst length.

When the 2-byte lookup table information is accumulated by each burst length (for example, 128 bytes of lookup table information for 64 blocks are accumulated), the compression data managing module 145 may record the lookup table information in the frame buffer memory 150. Therefore, the recording of the lookup table information may be maintained based on the burst length of the memory. This may result in maintaining the improved bandwidth without change and improving system stability.

That is, in the embodiment of the present invention, in the packaging module 144, the unit of packaging the compressed texture block may be the same as the unit of recording the lookup table information. Also, each unit may correspond to the burst length of the frame buffer memory 150. This configuration may cause the improvement of the bandwidth efficiency.

The compression data managing module 145 may refer to lookup table information relating to a previous block in order to generate lookup table information relating to a current block. In this instance, for blocks belonging to the same group, the same data cannot be repetitively processed, thereby reducing an amount of data processed.

The frame buffer memory 150 records data output from the thusly-configured compression module 140. Specifically, the compression data managing module 145 may control and manage the data recorded in the frame buffer memory 150.

Accordingly, the frame buffer memory 150 may store and maintain the compressed texture blocks, which have been packaged, by each frame, and also separately store and maintain lookup table information corresponding to each frame.

Also, the lookup table information may include 2-byte information for 16×4 block each. In one embodiment, the lookup table information may include burst group identification information and start offset information, which may allow for representing an offset, starting from a base address corresponding to each preset burst group, other than every address of the frame buffer memory 150.

Here, information related to the base address corresponding to each burst group may be separately stored and managed by the decompression module 160 and the compression module 140, respectively. Therefore, the decompression module 160 does not have to use all of the memory addresses to access the frame buffer memory 150.

Accordingly, the decompression module 160 can fast access a specific block even when it receives only the lookup table information from the frame buffer memory 150.

Also, by virtue of presetting the burst group identifiers and the corresponding base addresses and transmitting and receiving only the lookup table information associated therewith, overhead caused due to the transmission and reception of all of the values of the memory addresses can be reduced. This may result in improvement of data processing efficiency and reduction of bandwidths.

Meanwhile, the lookup table information included in the frame buffer memory 150 may be transferred to the decompression module 160. The decompression module 160 may access a specific position of the frame buffer memory 150 with reference to the lookup table information, thereby performing random access in response to a request of the motion compensation module 170. To this end, the decompression module 160 may include a first cache which requests the lookup table information from the buffer memory 150 and stores and manages the lookup table information.

In more detail, when a specific frame is identified in response to the request of the motion compensation module 160, the decompression module 160 may acquire group identification information, start offset information and a compression flag relating to each of blocks corresponding to the frame with reference to the lookup table information.

The decompression module 160 may then access a specific address of the frame buffer memory 150 corresponding to each block on the basis of the group identification information and the start offset information. Accordingly, in the embodiment according to the present invention, a problem that a long time is taken to search for a specific block, which has been caused in the related art compression method, can be overcome, and fast processing can be carried out while maintaining a bandwidth reduction effect.

The decompression module 160 may determine whether or not to decompress text blocks according to the compression flags, and if required, perform the decompression. The decompression module 160 may reconstruct the decompressed blocks to generate frame data requested by the motion compensation module 170. The decompression module 160 may then transfer the generated frame data to the motion compensation module 170.

Afterwards, the motion compensation module 170 may generate the prediction block based on the motion vector information, as aforementioned, and transfer the generated prediction block to the adder 180 to perform decoding of the image through the motion compensation in a sequential manner.

Hereinafter, description will be given of a video processing method according to an exemplary embodiment of the present invention, with reference to FIGS. 4 to 8.

Figure 4:
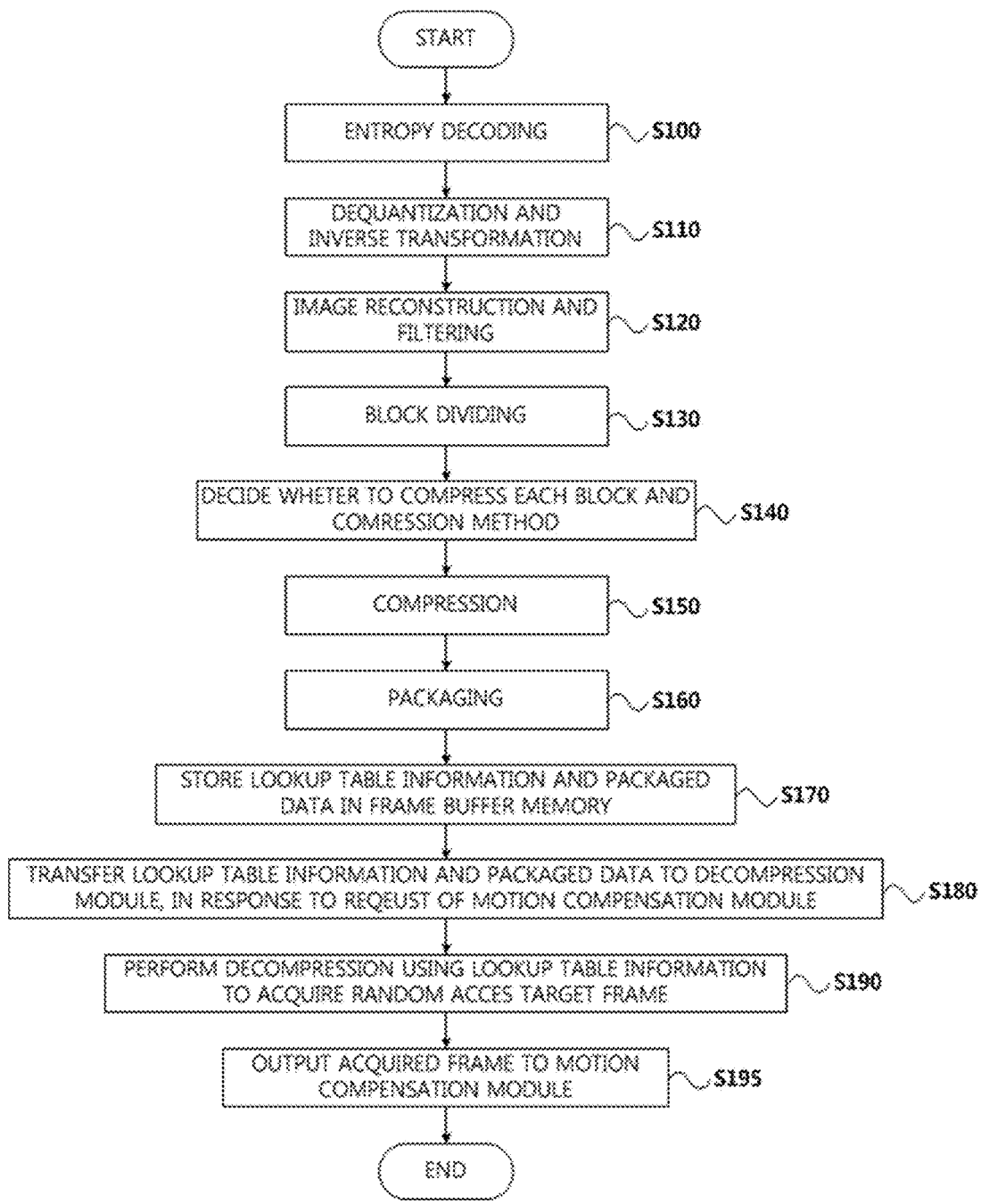
FIG. 4 is a flowchart illustrating a video decoding method in accordance with an exemplary embodiment disclosed herein.

As illustrated in FIG. 4, the video processing apparatus 100 receives a bit stream including encoded image data, and entropy-decodes the received bit stream (S100).

The video processing apparatus 100 performs dequantization and inverse transformation for the entropy-decoded image data (S110).

As aforementioned, the entropy decoding module 110 may decode the encoded bit stream which is transmitted from a video encoding apparatus, to separate into an intra prediction mode index, motion information, a quantization coefficient sequence and the like. The entropy decoding module 110 may provide the decoded motion information to the motion compensation module 170. The entropy decoding module 110 may also provide a dequantization coefficient sequence to the dequantizer/inverse transformer 120.

The dequantizer/inverse transformer 120 then transforms the quantization coefficient sequence into a 2D array of dequantization coefficients, selects one of a plurality of scanning patterns based on at least one of a prediction mode (i.e., one of intra prediction and inter prediction) of a current block and an intra prediction mode, and reconstructs the quantization coefficients using a quantization matrix, which is selected from a plurality of quantization matrices, to the 2D array of dequantization coefficients. The dequantizer/inverse transformer 120 inversely transforms the reconstructed quantization coefficients to reconstruct a residual block.

Afterwards, the video processing apparatus 100 reconstructs the image using the residual block and a prediction block, and filters the reconstructed image (S120).

As aforementioned, the adder 180 may reconstruct an image block by adding the residual block reconstructed by the dequantizer/inverse transformer 120 and the prediction block generated by the intra prediction module or the motion compensation module 170. The filtering module 130 may filter off the reconstructed image generated by the adder 180. The detailed filtering method has been described.

Afterwards, the video processing apparatus 100 divides the filtered frame by each block (S130).

The compression module 140 may divide the image frame into blocks, in order to compress and package image frame textures filtered by the filtering module 130 and record the packaged image frame textures in the frame buffer memory 150.

The video processing apparatus 100 decides whether or not to compress each divided block and a compression method (S140), and performs the compression for each block according to the decided method (S150). The video processing apparatus 100 then packages the compressed texture blocks (S160).

Afterwards, the video processing apparatus 100 stores lookup table information and packaged data into frame buffer memory (S170).

FIGS. 5 to 8 are views illustrating a configuration of the divided and packaged blocks according to an exemplary embodiment of the present invention.

Figure 5:
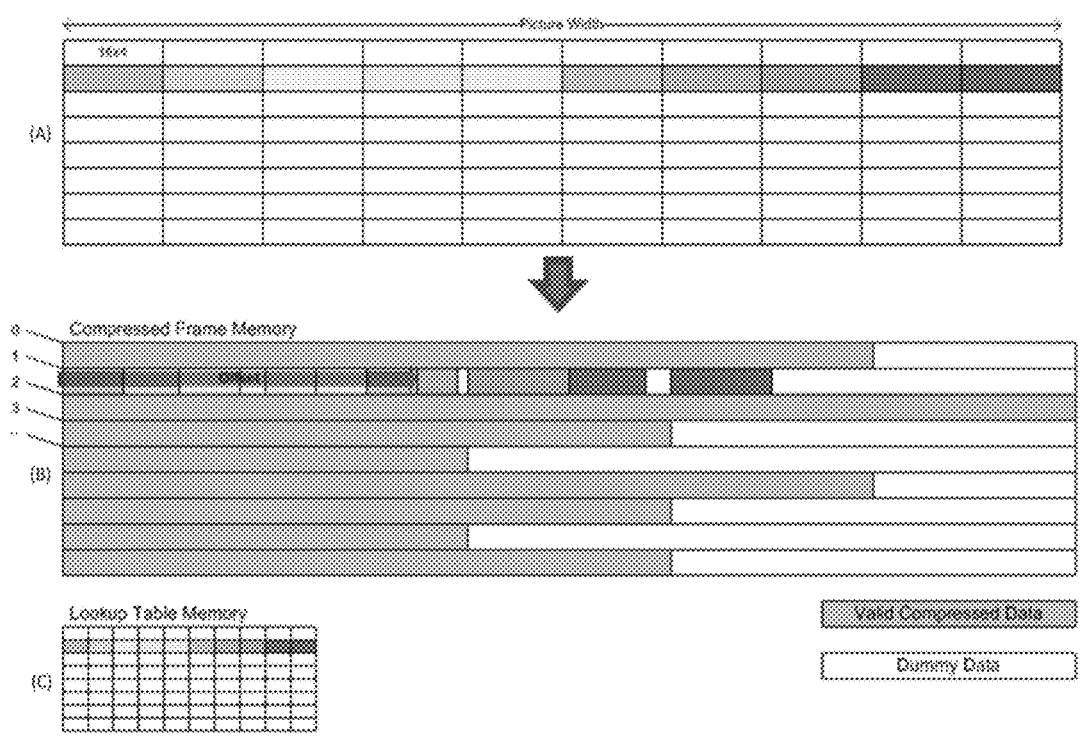
FIG. 5 is a view illustrating a frame buffer memory compressed according to an exemplary embodiment disclosed herein.

(A) of FIG. 5 illustrates a whole frame divided into blocks. As illustrated in (A) of FIG. 5, each frame may be divided into blocks each having a preset size. The preset size may be variable. 16×4 block is assumed in the embodiment disclosed herein. If a size of a picture is not a multiple of the preset size, an extra value of a block corresponding to an edge may be set to the same value as an edge pixel.

Figure 6:
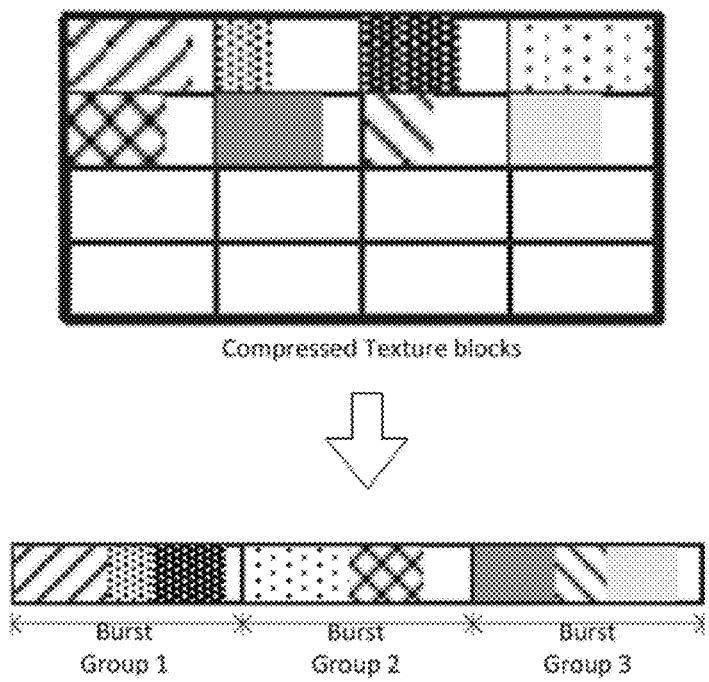
FIG. 6 is a view illustrating a compression method and grouping in accordance with an exemplary embodiment disclosed herein.

Meanwhile, as illustrated in FIG. 6, each of the divided blocks may be selectively compressed. Here, a compression method, as aforementioned, may be selected from one of uncompression, and variable-length coding compression using DPCM, on the basis of reduction or non-reduction of bandwidths.

Each compressed block may be packaged into each group according to a burst length. The packaging module 144 in this embodiment disclosed herein, as illustrated in a bottom of FIG. 6, may package the blocks by designating burst groups, respectively. A size of each burst group may correspond to a burst length of the frame buffer memory 150, and a group identifier may be assigned to each group.

Figure 7:
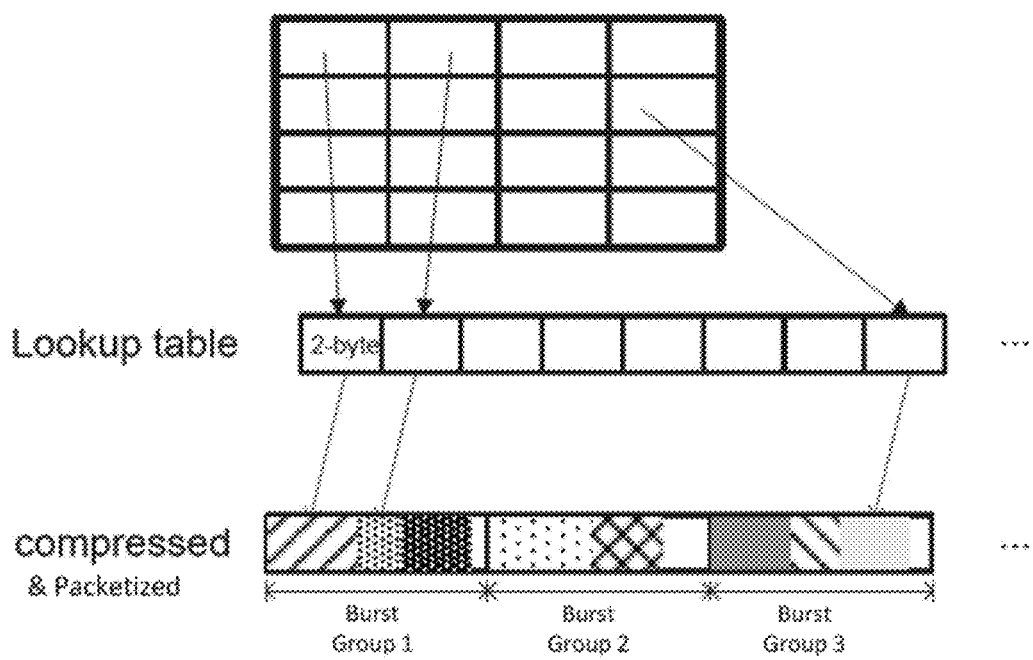
FIG. 7 is a view illustrating a lookup table in accordance with an exemplary embodiment disclosed herein.

Also, the packaging unit 144, as illustrated in FIG. 7, generates lookup table information corresponding to each block. The lookup table information may include information for identifying each divided block and a compressed or uncompressed state thereof from the packaged data. For example, the lookup table information may include 2-byte data containing 8-bit group identifier information, 7-bit start offset information and 1-bit compression flag. The lookup table information may be stored separately in the frame buffer memory 150.

Referring back to FIG. 5, (B) of FIG. 5 illustrates a storage space of the frame buffer memory 150 in which the packaged data is recorded in a sequential manner. As compared with the whole frame of (A) of FIG. 5, the whole frame of (B) of FIG. 5 can store the compressed texture data by each block.

Here, numbers 0, 1, 2 and 3 at the left of the drawing may indicate base addresses corresponding to burst groups, respectively. Each block may be identified according to burst group identification information and an offset value. A region in which no texture data is present in each burst group may be filled with dummy data.

Meanwhile, (C) of FIG. 5 illustrates lookup table information which is stored separately in the frame buffer memory 150. The lookup table information may be filled with 2-byte values corresponding to respective blocks, and arranged in the order of blocks constructing the whole frame.

Therefore, the decompression module 160 may receive only the lookup table information, as illustrated in (C) of FIG. 5, to identify texture blocks from the frame buffer memory 150, and can reconstruct an original frame by performing decompression and reconstruction for the blocks.

Also, as aforementioned, the transmission and reception of only the lookup table information may result in a reduction of overhead caused due to transmission and reception of every memory address. Consequently, improvement of data processing efficiency and reduction of bandwidths can be acquired.

Figures 8, 9:
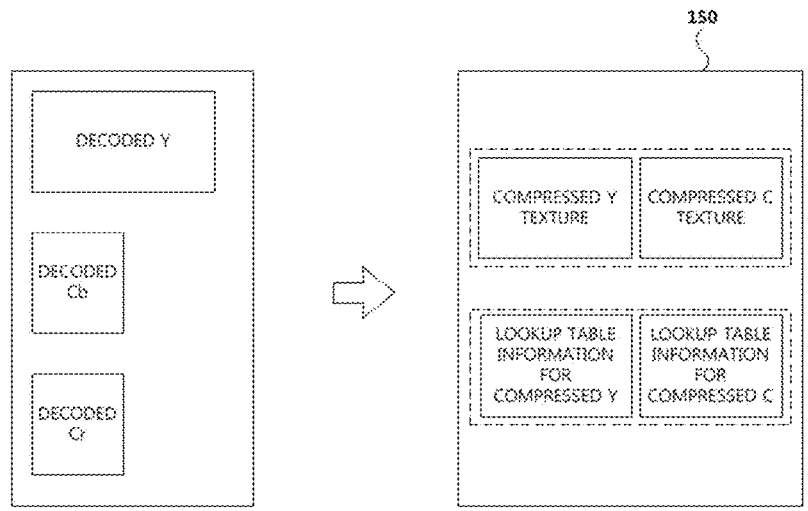
FIG. 8 is a view comparing information stored in a frame buffer memory according to an exemplary embodiment disclosed herein with the related art configuration.
FIGS. 9 to 16 are experimental data illustrating improved processing efficiency in case of applying an exemplary embodiment of the present invention.

FIG. 8 is a view illustrating a size variation of the frame buffer memory 150 according to an exemplary embodiment of the present invention, which illustrates a configuration of the frame buffer memory 150 for reducing bandwidths.

A left block diagram illustrates a typical frame buffer, and a right block diagram illustrates the frame buffer memory 150 which is compressed and packaged according to the exemplary embodiment of the present invention. As illustrated in FIG. 8, unlike the related art frame buffer which stores decoded Y, Cb and Cr values, the frame buffer memory 150 according to the exemplary embodiment of the present invention may include compressed Y texture data, compressed C texture data, lookup table information relating to the compressed Y, and lookup table information relating to the compressed C.

The frame buffer memory 150 according to the exemplary embodiment of the present invention may include a buffer for storing the lookup table information. A size of the buffer may be decided depending on an image frame size. For example, when 2-byte lookup table information is generated for a block of 16×4 pixels, a buffer size for lookup table information may be decided as $\frac{1}{32}$*(frame size) for one frame. Therefore, the frame buffer memory 150 according to the embodiment of the present invention may further include an additional buffer region as compared with the conventional frame buffer.

Also, when the 2-byte lookup table information is generated for the block of 16×4 pixels, a region-based buffer size of the frame buffer memory 150 may be derived by the following formulas.

| | |
|---|---|
| (PicX+15)/16*16*PicY | Compressed data for Luma: |
| (PicX/2+15)/16*16*PicY | Compressed data for Chroma: |
| (PicY+15)/16*(PicX+255)/256*128 | Lookup table for Luma: |
| (PicY+15)/16*(PicX/2+255)/256*128 | Lookup table for Chroma: |

Description will be back to FIG. 4.

Afterwards, the video processing apparatus 100 transfers the lookup table information and the packaged data to the decompression module 160 according to the reference frame request of the motion compensation module 170 (S180).

The decompression module 160 of the video processing apparatus 100 randomly accesses blocks constructing the corresponding frame using the lookup table information, and performs decompression of the blocks and frame reconstruction, thereby obtaining the reference frame (S190).

The video processing apparatus 100 transfers the obtained reference frame to the motion compensation module 170 (S195).

FIGS. 9 to 14 illustrate test data indicating results obtained by applying the video processing method in accordance with the exemplary embodiment of the present invention.

To test the bandwidth reduction effect of the video processing method according to the embodiment disclosed herein, various HEVC test sequences were used and classified into A to F according to image sizes. Bandwidths were estimated as a total amount of frame data in which reading/writing of a memory was performed through a 128-bit bus interface during a decoding process (while reading/writing of the reference frame was performed for motion compensation). Also, four different qp values (22, 27, 32 and 37) for each sequence were used.

Considering the whole results of FIGS. 9 to 16, it was understood that the video processing method according to the exemplary embodiment disclosed herein could save 56% of bandwidths on average rather than pure bandwidths when a loop filter module performs writing. Also, it was understood that the video processing method according to the exemplary embodiment of the present invention could save 59% of bandwidths on average rather than pure bandwidths when a motion compensation module performs writing.

Figures 10, 11:
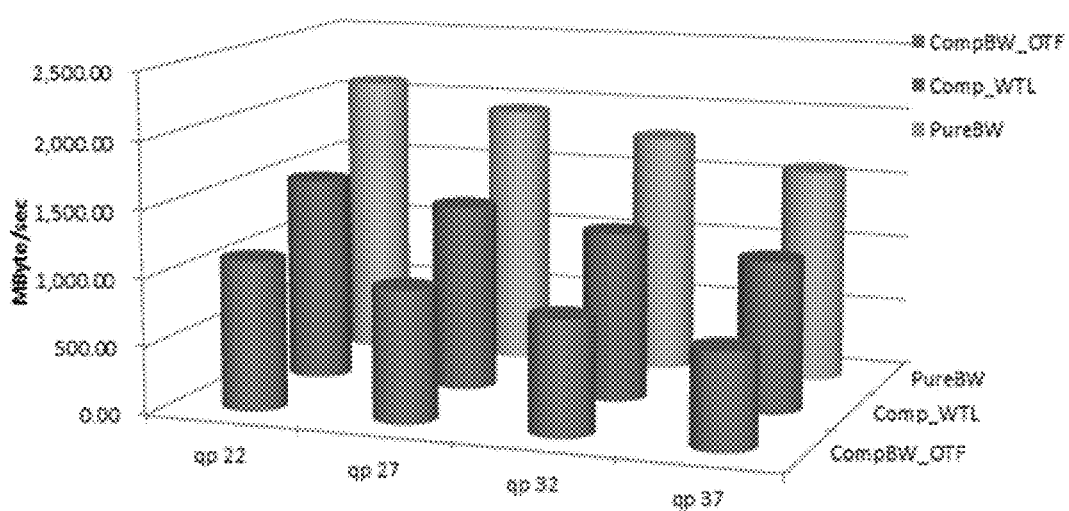
Figure 12:
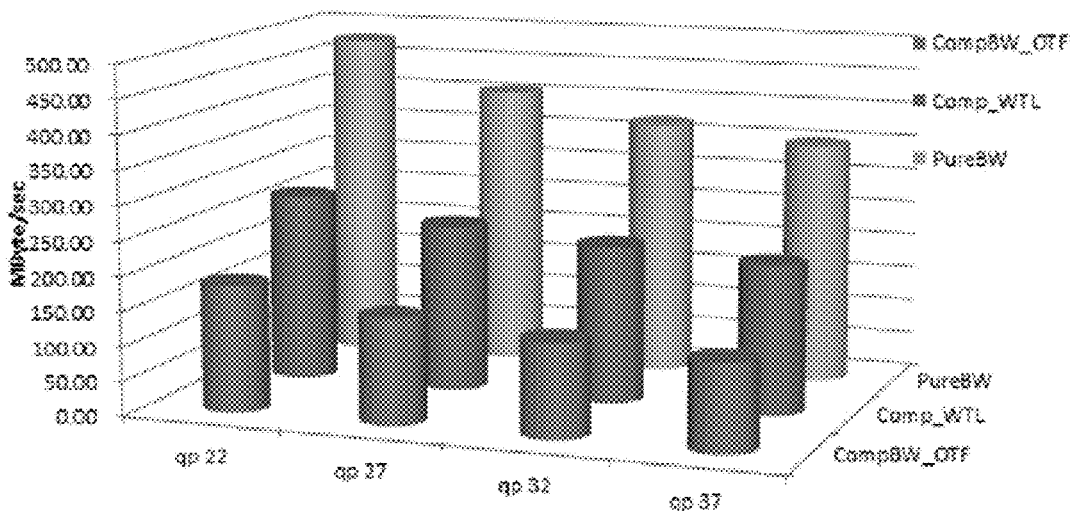
Figure 13:
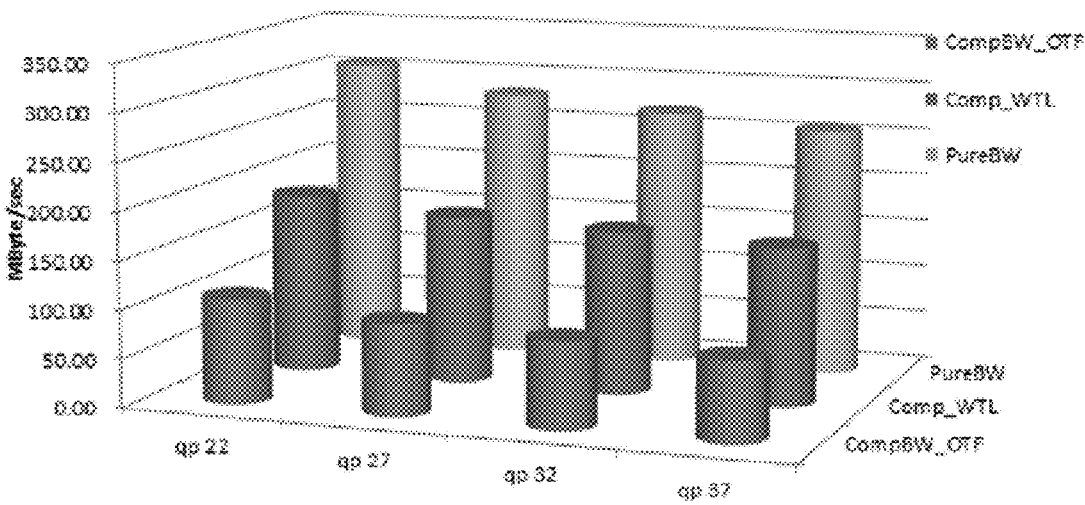
Figure 14:
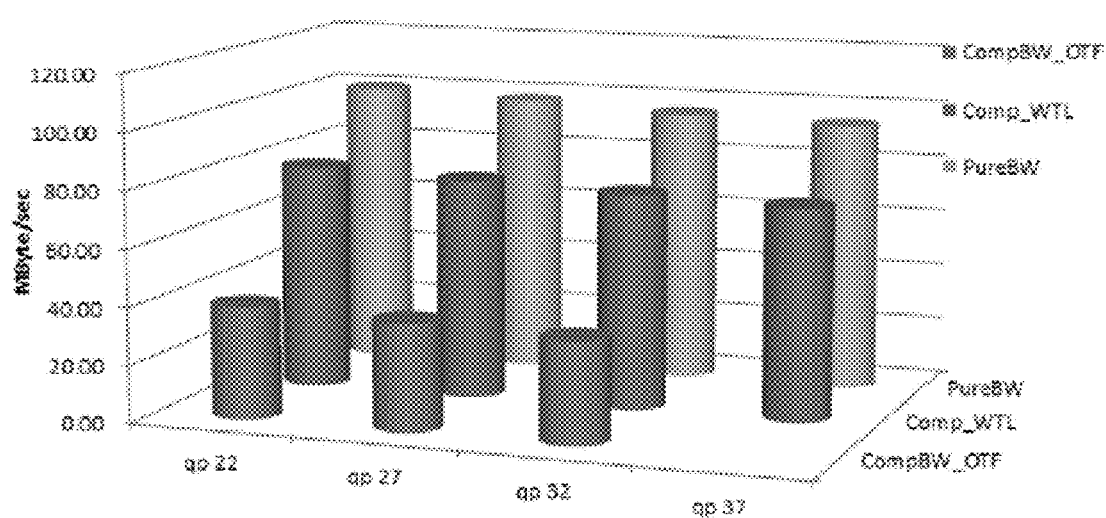

FIGS. 9 and 10 illustrate compensation results in a classifying manner of average bandwidths due to a frame buffer compression of the video processing method according to the embodiment disclosed herein and pure bandwidths without compression performed.

FIG. 9 illustrates a bandwidth reduction rate when the decoding apparatus illustrated in FIG. 1 processes a video in accordance with one exemplary embodiment of the present invention, and FIG. 10 illustrates a bandwidth reduction rate when the decoding apparatus illustrated in FIG. 2 processes a video in accordance with another exemplary embodiment of the present invention.

Meanwhile, FIGS. 10 to 14 are graphs visually illustrating comparison results according to each condition. As can be understood through the graphs, a remarkable bandwidth reduction can be obtained according to the embodiment of the present invention.

Figure 15:
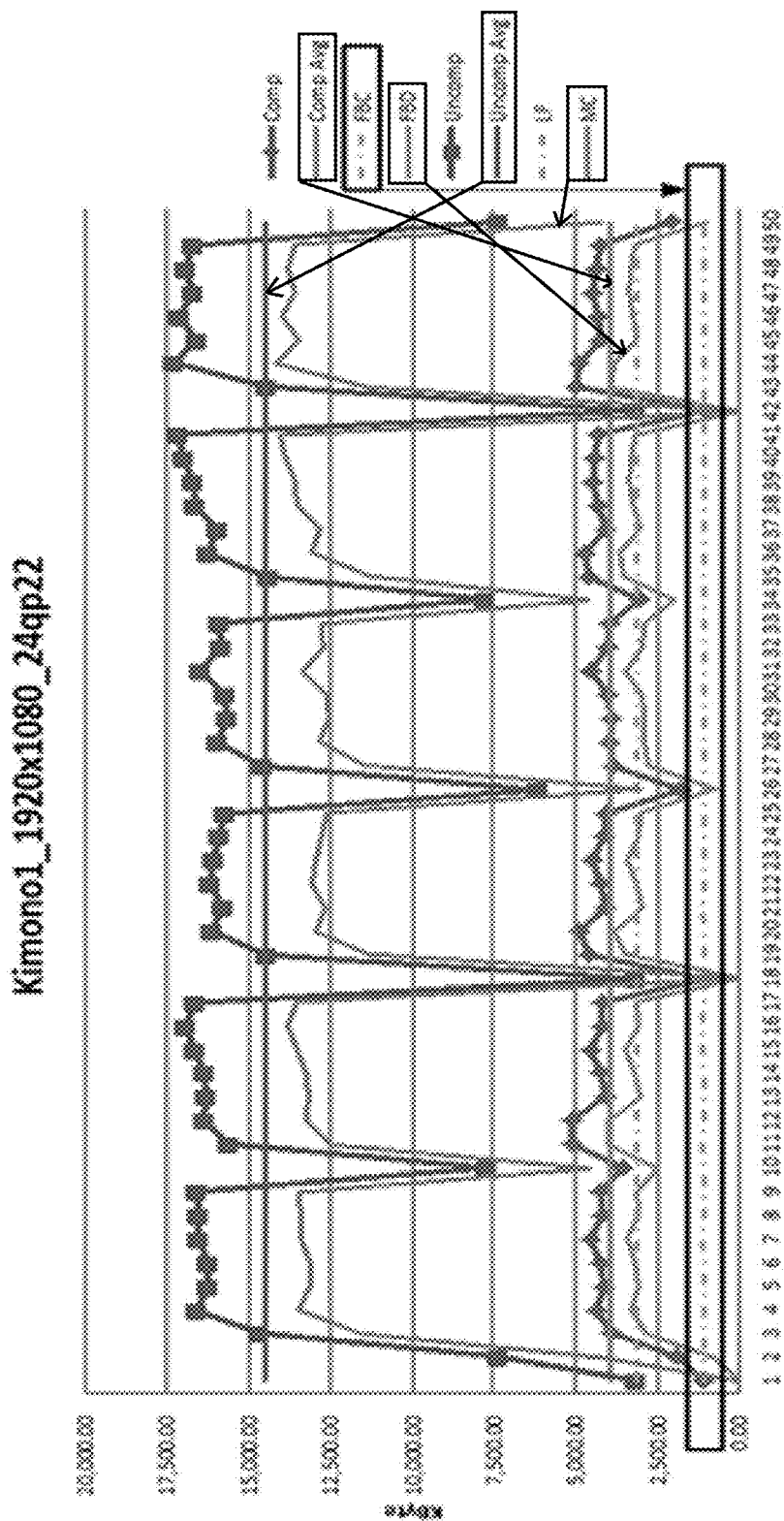

FIG. 15 also illustrates maintenance of bandwidth stability as well as the bandwidth reduction according to the video processing method according to the exemplary embodiment of the present invention. With regard to results of the frame buffer compression (line marked with FBC) according to the embodiment of the present invention in FIG. 15, it can be understood that an almost uniform value is maintained in spite of the drastic change of uncompressed image information while about 70% of bandwidths is reduced rather than uncompression (Uncomp). Therefore, the present invention can maintain bandwidth stability and derive an advantageous result for cache design.

Figure 16:
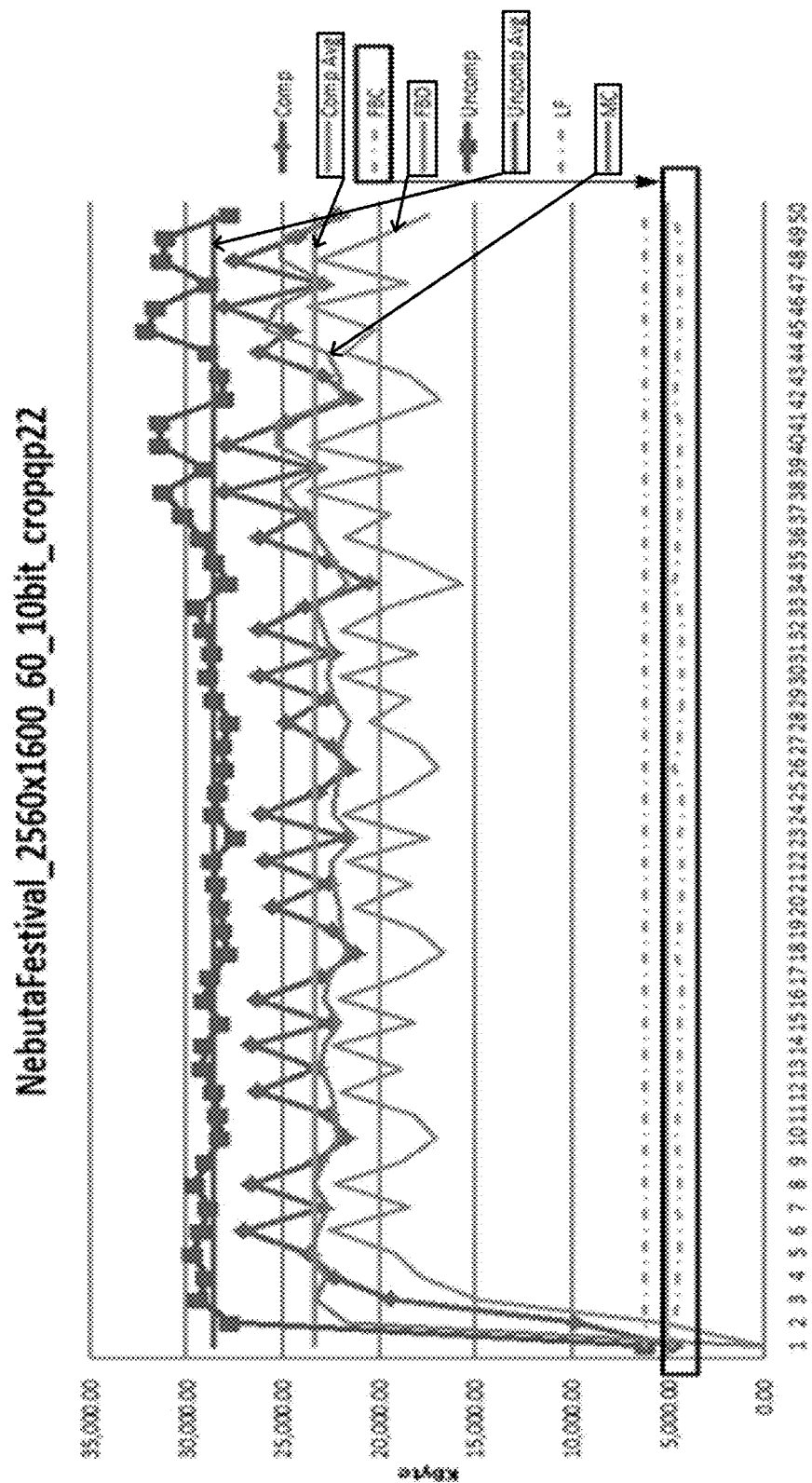

FIG. 16 illustrates that an average bandwidth upon the frame buffer compression (line marked with FBC) is reduced below 20% rather than a bandwidth of uncompressed (Uncomp) data. The embodiment according to the present invention can allow for processing high-resolution image while maintaining image quality by virtue of the bandwidth reduction.

The aforementioned methods according to the present invention can be written as computer programs to be implemented in a computer and be recorded in a computer readable recording medium. Examples of the computer readable recording medium include read-only memory (ROM), random-access memory (RAM), CD-ROMs, magnetic tapes, floppy disks, optical data storage devices, and carrier waves, such as data transmission through the Internet.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While exemplary embodiments of the present invention have been shown and described, the present invention is not limited to the described exemplary embodiments. Instead, it would be appreciated by those skilled in the art that various changes and modifications may be made to these exemplary embodiments without departing from the spirit and scope of the invention as defined by the appended claims, and these changes and modifications are not construed as being separated from the technical idea and prospects of the present invention.

The invention claimed is:

1. A video processing apparatus for processing motion compensation of a plurality of frames, the video processing apparatus comprising:
   an image receiver receiving encoded data;
   a filter filtering an image frame reconstructed from the encoded data;
   a block divider dividing a reference frame into a plurality of blocks, wherein the reference frame is obtained from the filtered image frame and is transmitted to a motion compensation module which processes the motion compensation of the plurality of frames;
   a compression processor selectively compressing each of the plurality of blocks, which is received from the block divider, in a method selected from one of an uncompression method or a lossless compression method on a basis of reduction or non-reduction of bandwidths with respect to a frame buffer memory that contains the reference frame, packaging the plurality of blocks in a unit of a burst group, wherein a size of the burst group corresponds to a burst length of the frame buffer memory, and generating lookup table information corresponding to each of the packaged plurality of blocks; and
   the frame buffer memory recording the packaged data and the lookup table information and providing the reference frame for the motion compensation by using the package data and the lookup table information.

2. The apparatus of claim 1, wherein the lookup table information comprises group identification information and offset information, and is used to identify a specific block from the packaged data.

3. The apparatus of claim 1, wherein the compression processor records the lookup table information in the frame buffer memory when the lookup table information is accumulated in the same size as the burst length of the frame buffer memory.

4. The apparatus of claim 1, further comprising a decompression processor accesses the packaged data using the lookup table information in response to a reference frame request of a motion compensation module, and acquires a plurality of blocks corresponding to the reference frame from the packaged data.

5. The apparatus of claim 4, wherein the decompression processor performs decompression of the acquired plurality of blocks on the basis of the lookup table information, reconstructs the reference frame, and transfers the reconstructed reference frame to the motion compensation module.

6. The apparatus of claim 1, further comprising:
   an uncompression processing processor processing an image signal output from the filter in an uncompression manner and transferring the uncompressed image signal; and
   an output module displaying the uncompressed image signal.

7. A video processing method for a video processing apparatus, the method comprising:
   receiving an encoded image;
   filtering an image frame reconstructed from the encoded image;
   dividing a reference frame obtained from the filtered image frame into a plurality of blocks;
   selectively compressing each of the plurality of blocks in a method selected from one of an uncompression method or a lossless compression method on a basis of reduction or non-reduction of bandwidths with respect to a frame buffer memory;
   packaging the plurality of blocks in a unit of a burst group, wherein a size of the burst group corresponds to a burst length of the frame buffer memory;

generating lookup table information to correspond to each of the packaged plurality of blocks; and recording the packaged data and the lookup table information and providing the reference frame for motion compensation by using the package data and the lookup table information.

8. The method of claim 7, wherein the lookup table information comprises group identification information and offset information and is used to identify a specific block from the packaged data.

9. The method of claim 8, wherein the step of the recording of the lookup table information records the lookup table information in the frame buffer memory when the lookup table information is accumulated in the same size as the burst length of the frame buffer memory.

10. The method of claim 7, further comprising:
accessing the packaged data using the lookup table information in response to a reference frame request of a motion compensation module; and
acquiring a plurality of blocks corresponding to the reference frame from the packaged data.

11. The method of claim 10, further comprising:
performing decompression for the acquired plurality of blocks based on the lookup table information;
reconstructing the reference frame; and
transferring the reconstructed frame to the motion compensation module.

12. The method of claim 11, further comprising:
processing an image signal output from a filter in an uncompression manner into an uncompressed image signal and transferring the uncompressed image signal; and
displaying the uncompressed image signal.

13. A non-transitory computer readable medium storing a program causing a computer to execute a video processing method for a video processing apparatus, the method comprising:
receiving an encoded image;
filtering an image frame reconstructed from the encoded image;
dividing a reference frame obtained from the filtered image frame into a plurality of blocks;
selectively compressing each of the plurality of blocks in a method selected from one of an uncompression method or a lossless compression method ion a basis of reduction or non-reduction of bandwidths with respect to a frame buffer memory;
packaging the plurality of blocks in a unit of a burst group, wherein a size of the burst group corresponds to a burst length of the frame buffer memory;
generating lookup table information to correspond to each of the packaged plurality of blocks; and
recording the packaged data and the lookup table information and providing the reference frame for motion compensation by using the package data and the lookup table information.

14. The non-transitory computer readable medium of claim 13, wherein the lookup table information comprises group identification information and offset information and is used to identify a specific block from the packaged data.

15. The non-transitory computer readable medium of claim 13, wherein the step of the recording of the lookup table information records the lookup table information in the frame buffer memory when the lookup table information is accumulated in the same size as the burst length of the frame buffer memory.

16. The non-transitory computer readable medium of claim 13, further comprising:
accessing the packaged data using the lookup table information in response to a reference frame request of a motion compensation module; and
acquiring a plurality of blocks corresponding to the reference frame from the packaged data.

17. The non-transitory computer readable medium of claim 13, further comprising:
performing decompression for the acquired plurality of blocks based on the lookup table information;
reconstructing the reference frame; and
transferring the reconstructed frame to the motion compensation module.

18. The non-transitory computer readable medium of claim 13, further comprising:
processing an image signal output from a filter in an uncompression manner into an uncompressed image signal and transferring the uncompressed image signal; and
displaying the uncompressed image signal.

* * * * *